(12) United States Patent
Liu et al.

(10) Patent No.: US 11,951,374 B2
(45) Date of Patent: Apr. 9, 2024

(54) EXERCISE EQUIPMENT WITH ROTATABLE DISPLAY

(71) Applicant: Dyaco International Inc., Taipei (TW)

(72) Inventors: Shih-Wei Liu, Taipei (TW); Hung-Ta Tung, Taipei (TW)

(73) Assignee: Dyaco International Inc., Taipei (TW)

(*) Notice: Subject to any disclaimer, the term of this patent is extended or adjusted under 35 U.S.C. 154(b) by 140 days.

(21) Appl. No.: 17/874,729

(22) Filed: Jul. 27, 2022

(65) Prior Publication Data

US 2023/0415020 A1 Dec. 28, 2023

(30) Foreign Application Priority Data

Jun. 28, 2022 (TW) .................................. 111124098

(51) Int. Cl.
*A63B 71/06* (2006.01)

(52) U.S. Cl.
CPC .. *A63B 71/0619* (2013.01); *A63B 2071/0658* (2013.01)

(58) Field of Classification Search
CPC ........ A63B 71/0619; A63B 2071/0658; A63B 23/0476; A63B 2210/50; A63B 71/0622; A63B 22/00; A63B 22/06; A63B 22/0002; A63B 22/001; A63B 22/0012; A63B 2022/06; A63B 69/16; B62J 50/225
See application file for complete search history.

(56) References Cited

U.S. PATENT DOCUMENTS

| | | | | | |
|---|---|---|---|---|---|
| 4,572,501 | A | * | 2/1986 | Durham | A63B 22/001 601/36 |
| 4,673,178 | A | * | 6/1987 | Dwight | A63B 22/0605 482/57 |
| 4,846,156 | A | * | 7/1989 | Kopnicky | A63B 22/0694 601/36 |
| 4,902,002 | A | * | 2/1990 | Huang | A63B 22/0005 482/62 |
| 4,976,426 | A | * | 12/1990 | Szabo | A63B 22/0002 601/36 |
| 5,044,627 | A | * | 9/1991 | Huang | A63B 22/0012 482/115 |
| 5,342,262 | A | * | 8/1994 | Hansen | A63B 22/0605 482/62 |
| 5,569,128 | A | * | 10/1996 | Dalebout | A63B 22/0005 482/57 |
| 5,857,943 | A | * | 1/1999 | Murray | A63B 22/0605 482/57 |
| 5,980,431 | A | * | 11/1999 | Miller, Jr. | A63B 22/0012 482/57 |
| 6,036,623 | A | * | 3/2000 | Mitchell | A63B 23/03575 482/57 |

(Continued)

*Primary Examiner* — Garrett K Atkinson
(74) *Attorney, Agent, or Firm* — Donald E. Stout; Stout, Uxa & Buyan, LLP

(57) ABSTRACT

An exercise equipment comprises a display and a rotating mechanism, which includes a rotatable body and a stationary body. The rotatable body connects with the display, and the stationary body connects with a mechanism of the exercise equipment. The display rotates with the rotatable body, whose angle of rotation has an upper limit to avoid damage to wires. In addition, the rotating mechanism can emit a sound to notify the user that the display has been rotated to a specific angle.

10 Claims, 7 Drawing Sheets

(56) References Cited

U.S. PATENT DOCUMENTS

| | | | | |
|---|---|---|---|---|
| 6,840,892 B1* | 1/2005 | Wu | A63B 22/0005 | 482/62 |
| 7,789,808 B2* | 9/2010 | Lee | A63B 22/0007 | 482/57 |
| 8,562,488 B2* | 10/2013 | Alberts | A63B 24/0062 | 482/901 |
| 8,968,162 B2* | 3/2015 | Jaguan | A63B 21/4035 | 482/57 |
| 9,592,421 B2* | 3/2017 | Eder | A63B 23/12 | |
| 9,636,539 B1* | 5/2017 | Brumit | A63B 21/22 | |
| 10,010,745 B1* | 7/2018 | Brumit | A61H 1/0255 | |
| 10,426,996 B1* | 10/2019 | Brumit | A61H 1/0214 | |
| 10,493,319 B2* | 12/2019 | Velert | A63B 22/001 | |
| 11,235,197 B2* | 2/2022 | Carruthers | A63B 22/04 | |
| 11,786,797 B2* | 10/2023 | Rozo | A63B 22/0605 | 482/1 |
| 2006/0094569 A1* | 5/2006 | Day | A63B 24/00 | 482/57 |
| 2007/0129219 A1* | 6/2007 | Mahlberg | A61H 1/0237 | 482/57 |
| 2008/0085819 A1* | 4/2008 | Yang | A63B 22/0605 | 482/57 |
| 2011/0082397 A1* | 4/2011 | Alberts | A61H 1/02 | 482/8 |
| 2013/0130798 A1* | 5/2013 | Nir | A63F 13/90 | 463/36 |
| 2015/0306451 A1* | 10/2015 | Arnold | A63B 22/001 | 482/52 |
| 2016/0206915 A1* | 7/2016 | Velert | A63B 22/0005 |
| 2018/0221705 A1* | 8/2018 | Solodovnik | A63B 22/0005 |
| 2018/0228682 A1* | 8/2018 | Bayerlein | A63B 21/00181 |
| 2019/0070453 A1* | 3/2019 | Kiani | A63B 22/208 |
| 2021/0220696 A1* | 7/2021 | Carruthers | A63B 21/4045 |
| 2022/0016511 A1* | 1/2022 | Rozo | A63B 71/0622 |
| 2022/0062736 A1* | 3/2022 | Farrell | A63B 71/0619 |

* cited by examiner

EXERCISE EQUIPMENT WITH ROTATABLE DISPLAY

CROSS-REFERENCE TO RELATED APPLICATIONS

The entire contents of Taiwan Patent Application No. 111124098, filed on Jun. 28, 2022, from which this application claims priority, are expressly incorporated herein by reference.

BACKGROUND OF THE INVENTION

1. Field of the Invention

The present invention relates to an exercise equipment having a rotatable display.

2. Description of Related Art

Exercise equipment such as an elliptical trainer is usually equipped with a display to show the status, operation modes, and control parameters of the exercise equipment. In addition, the display can also show the user's exercise data and physiological parameters, such as duration of exercise, mileage run, heart rate, and calories burned. In addition, the display can also be connected to the Internet or a mobile phone to display pictures or videos.

In some cases, it is necessary to turn the display. For example, the user performs other physical activities, such as yoga, on a side of the exercise equipment. At this time, the display needs to be rotated so that the user can obtain the state of exercise through the display or assist in training through the teaching video on the display.

Taiwan Patent Publication No. M578596 discloses an exercise equipment including a rotatable display. The display is usually connected to the central processing unit of the exercise equipment through wires. However, if the display is rotated too far, the wires may be damaged.

SUMMARY OF THE INVENTION

In one aspect, an exercise equipment is provided with a display and a rotating mechanism. The rotating mechanism is connected to the display to rotate the display to an angle by turning right or left. The rotating mechanism comprises a rotatable body and a stationary body. The rotatable body is fixed to the display and comprises a hollow cylinder, which comprises a channel and comprises a first through hole at its wall. The stationary body is arranged in the channel and comprises a lower end fixed with a mechanism of the exercise equipment. The stationary body further comprises a recessed area configured to form an annular space between the rotatable body and the recessed area. The stationary body further comprises a first positioning hole located in the recessed area. A first positioning post is disposed in the first through hole and extends to the annular space without contacting an outer surface of the recessed area. A second positioning post is disposed in the first positioning hole and extends to the annular space without contacting an inner surface of the hollow cylinder. Whereby the rotation of the rotatable body causes the first positioning post to move along the annular space until it is blocked by the second positioning post.

In another aspect, an exercise equipment is provided with a display and a rotating mechanism. The rotating mechanism is connected to the display to rotate the display to an angle by turning right or left. The rotating mechanism comprises a rotatable body and a stationary body. The stationary body is fixed with a mechanism of the exercise equipment and comprises a channel and a first through hole at its wall. The rotatable body is fixed with the display and is disposed in the channel. The rotatable body comprises a cylinder, which comprises a recessed area configured to form an annular space between the stationary body and the recessed area. The rotatable body further comprises a first positioning hole located in the recessed area. A first positioning post is disposed in the first through hole and extends to the annular space without contacting an outer surface of the recessed area. A second positioning post is disposed in the first positioning hole and extends to the annular space without contacting an inner surface of the stationary body. Whereby the rotation of the rotatable body causes the second positioning post to move along the annular space until it is blocked by the first positioning post.

According to the rotation mechanism of the present invention, the angle of rotation of the display has an upper limit to avoid the wires being damaged. In addition, in a preferred embodiment, the rotating mechanism further generates a sound to notify the user that the display has been rotated to a specific angle.

DETAILED DESCRIPTION OF THE PREFERRED EMBODIMENT

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components. Wherever possible, the same or similar reference numbers are used in drawings and the description to refer to the same or like parts.

Figure 1A:
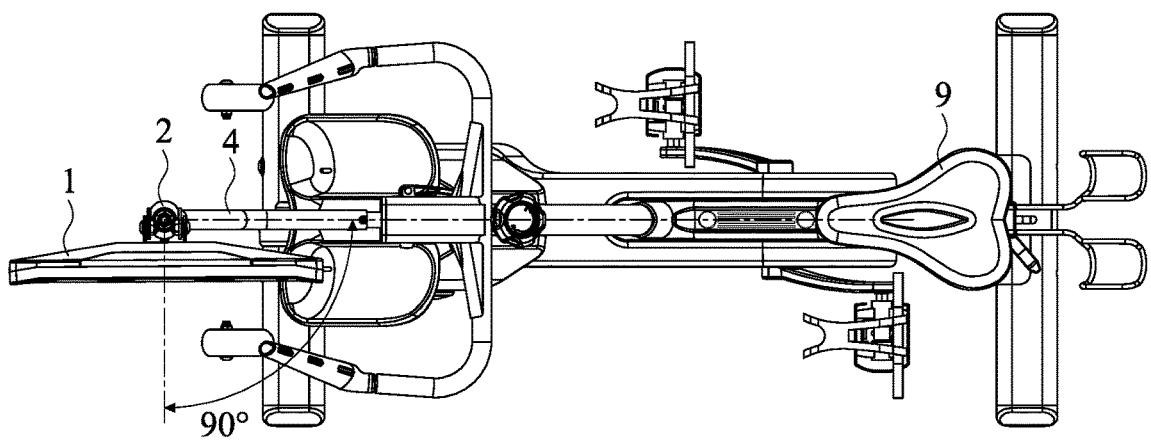
FIGS. 1A-1C show an exercise equipment having a rotatable display in accordance with an embodiment of the present invention, wherein the display can be rotated to different angles.
Figure 1B:
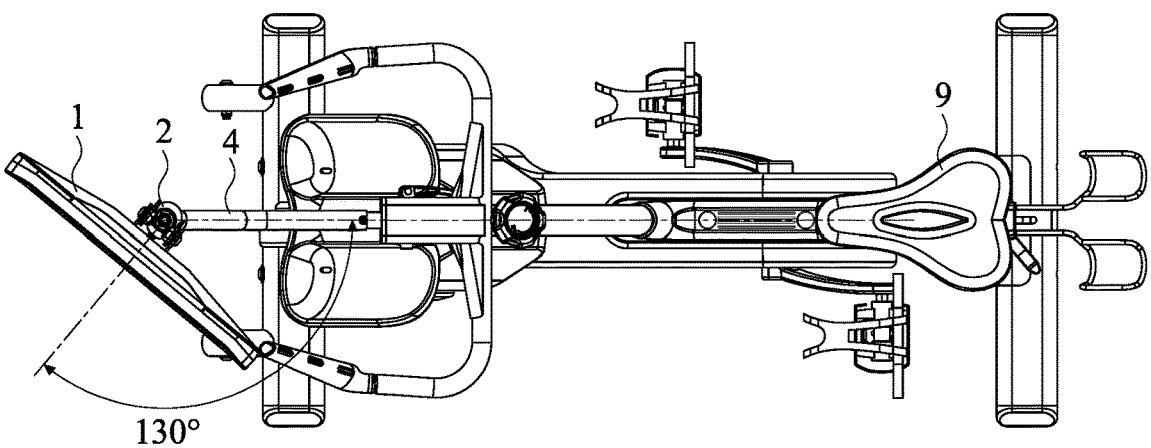
Figure 1C:
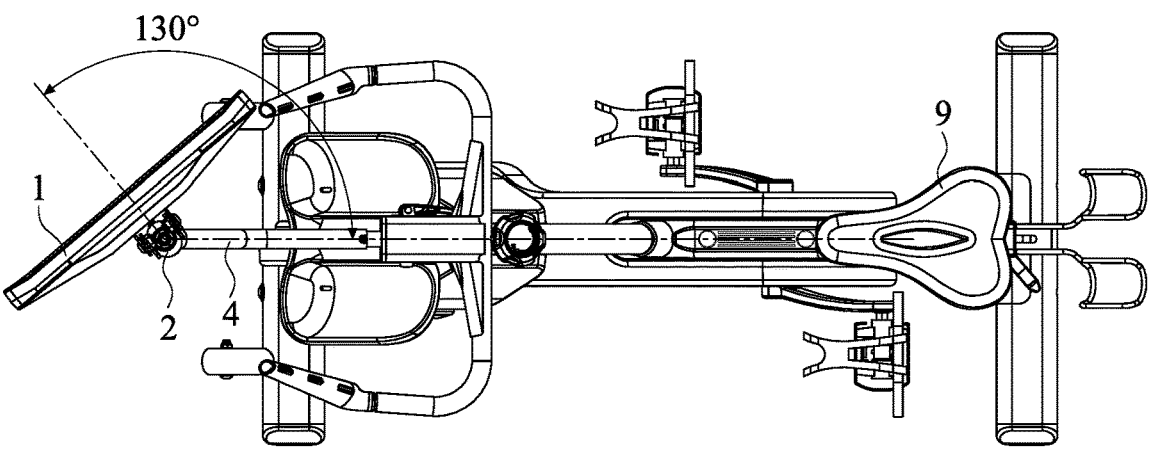

FIGS. 1A-1C show an exercise equipment having a display 1 and a rotating mechanism 2 in accordance to an embodiment of the present invention, wherein the display 1 can be rotated left or right through the rotating mechanism 2. If the direction that the display 1 faces a user on a seat 9 is taken as a reference direction (0 degrees), the angle of rotation of the display 1 has an upper limit, which is usually between 100 degrees and 180 degrees. For example, the upper limit is 130 degrees in the exemplary embodiment. FIG. 1A shows the display 1 being rotated 90 degrees to the right. FIG. 1B shows the display 1 being rotated 130 degrees to the left. FIG. 1C shows the display 1 being rotated 130 degrees to the left.

Figure 2:
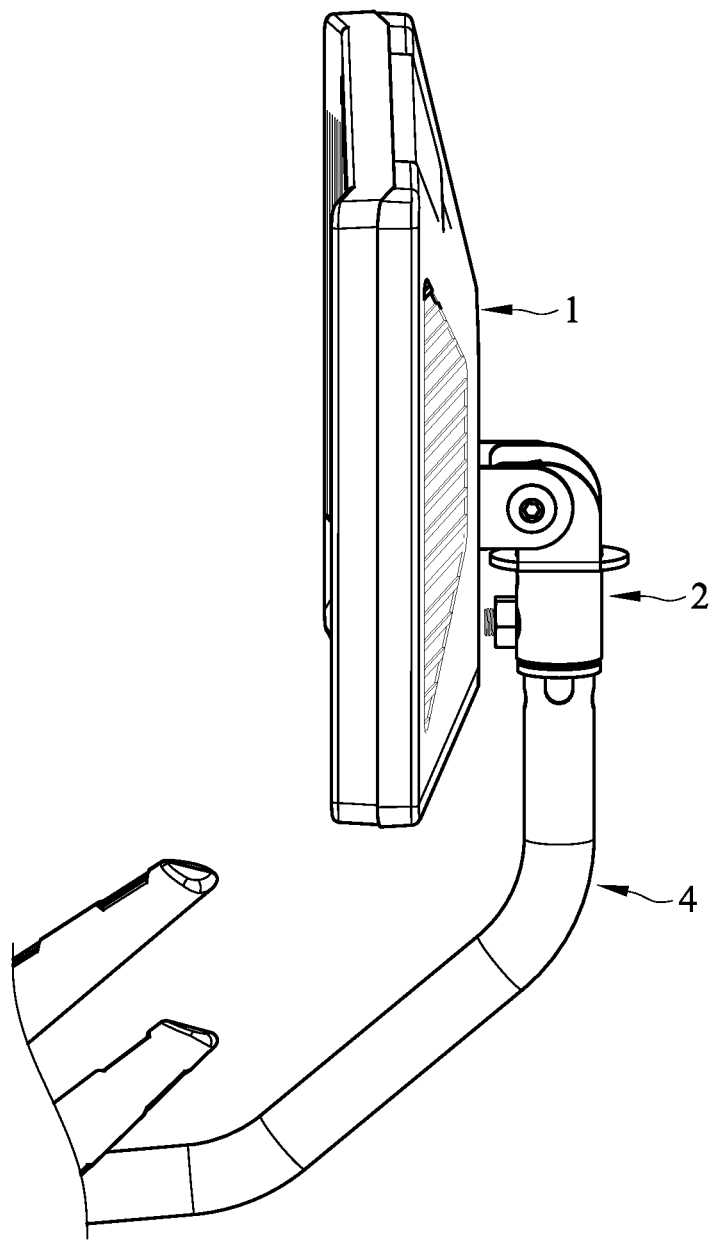
FIG. 2 is a partial view showing an exercise equipment having a display and a rotating mechanism in accordance with an embodiment of the present invention.
Figure 3:
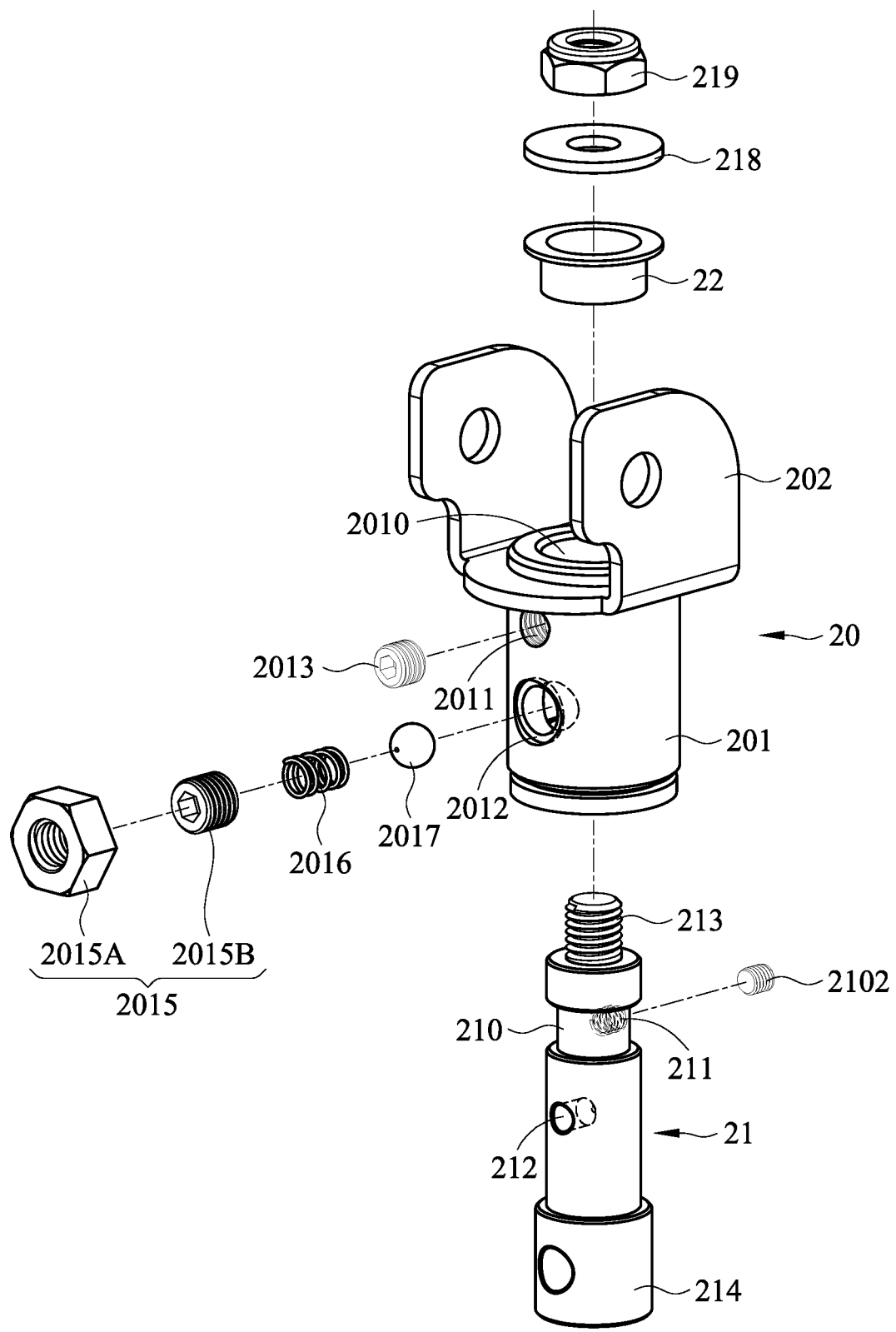
FIG. 3 is an exploded view of the rotating mechanism of FIG. 2.
Figure 4:
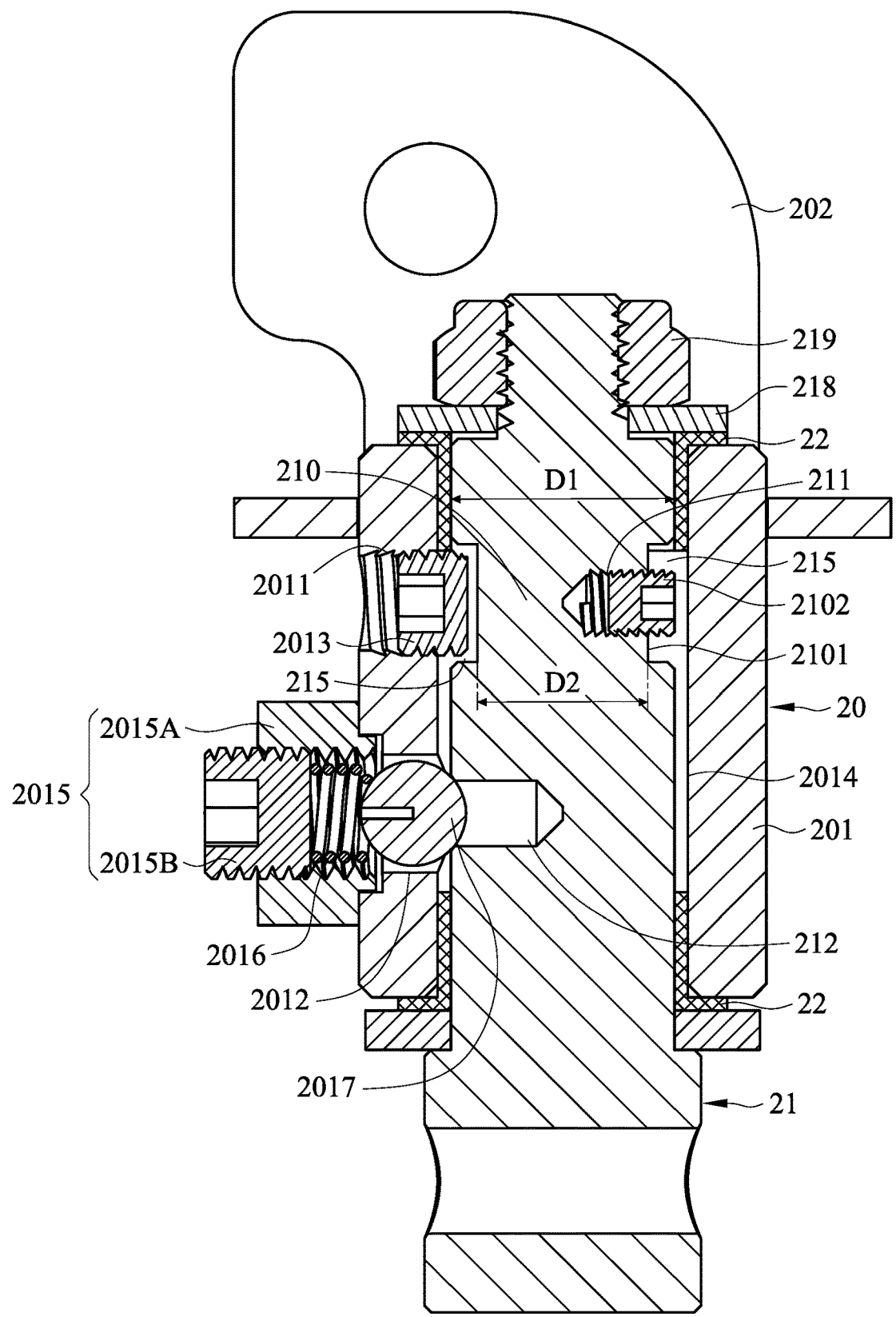
FIG. 4 is a cross-sectional view of the rotating mechanism of FIG. 2.

FIG. 2 is a partial view showing an exercise equipment having a display 1 and a rotating mechanism 2 according to an embodiment of the present invention. FIG. 3 and FIG. 4 are exploded view and cross-sectional view of the rotating mechanism 2, respectively. Referring to FIGS. 2-4, the rotating mechanism 2 includes a rotatable body and a stationary body 21. The rotatable body 20 is basically composed of a hollow cylinder 201 and a retaining bracket 202. The hollow cylinder 201 is fixed to the retaining bracket 202, and the display 1 is mounted on the retaining bracket 202. The center of the hollow cylinder 201 has a channel 2010, and the wall of the hollow cylinder 201 has a first through hole 2011 and a second through hole 2012.

Referring to FIGS. 2-4, the stationary body 21 is substantially cylindrical and is disposed in the channel 2010 of the hollow cylinder 201. An upper end 213 of the stationary body 21 may have threads so that it can connect with a washer 218 and a nut 219 after passing through the channel 2010. A lower end 214 of the stationary body 21 is fixed to a mechanism 4 of the exercise equipment. The stationary body 21 includes a cylindrical recessed area 210, the diameter D2 of which is smaller than the diameter D1 of the stationary body 21, so that an annular space 215 is formed between the stationary body 21 and the inner side of the rotatable body 20. The stationary body 21 further includes a first positioning hole 211 and a second positioning hole 212. The first positioning hole 211 is located in the recessed area 210. The elevation of the first positioning hole 211 is same as the elevation of the first through hole 2011, and the elevation of the second positioning holes 212 is same as the elevation of the second through holes 2012.

Referring to FIGS. 2-4, the rotatable body 20 further includes a first positioning post 2013, which is disposed in the first through hole 2011 and extends to the annular space 215 (not contact an outer surface 2101 of the recessed area 210). The first positioning post 2013 may be a set screw, but it is not limited thereto. Other components having the similar shape or capable of performing the same function can also be used.

Referring to FIGS. 2-4, the stationary body 21 further includes a second positioning post 2102, which is disposed in the first positioning hole 211 and extends to the annular space 215 (not contact the interior surface 2014 of the hollow cylinder 201). The second positioning post 2102 may be a set screw, but it is not limited thereto. Other components having the similar shape or capable of performing the same function can also be used.

Referring to FIGS. 2-4, the rotatable body 20 may further includes a holding member 2015, a spring 2016, and a ball 2017. The holding member 2015 is arranged on the outer surface of the hollow cylinder 201, the ball 2017 is arranged in the second through hole 2012, and the spring 2016 is arranged between the hold member 2015 and the ball 2017. In the exemplary embodiment, the holding member 2015 may include a nut 2015A and a set screw 2015B, and other components having the similar shape or capable of performing the same function can also be used. The nut 2015A may be mounted to the hollow cylinder 201, for example, by welding.

Referring to FIG. 4, there may be two bushings 22 between the rotatable body 20 and the stationary body 21 to reduce the sound generated by the rotation of the rotatable body 20.

Referring to FIGS. 2-4, through the above design, the rotatable body 20 can rotate relative to the stationary body 21. In addition, the display 1 is fixed with the rotatable body and the stationary body 21 is fixed with the mechanism 4 of the exercise equipment. Therefore, the display 1 can be rotated with the rotatable body 20. As shown in FIG. 1A and FIG. 4, when the display 1 is rotated so that the second through hole 2012 corresponds to the second positioning hole 212, the ball 2017 (e.g. a steel ball) is inserted into the second positioning hole 212 by a force provided by the spring 2016, thereby producing a sound to notify the user that the display 1 has been rotated to, e.g., 90 degrees so as to face a side the exercise equipment.

Figure 5:
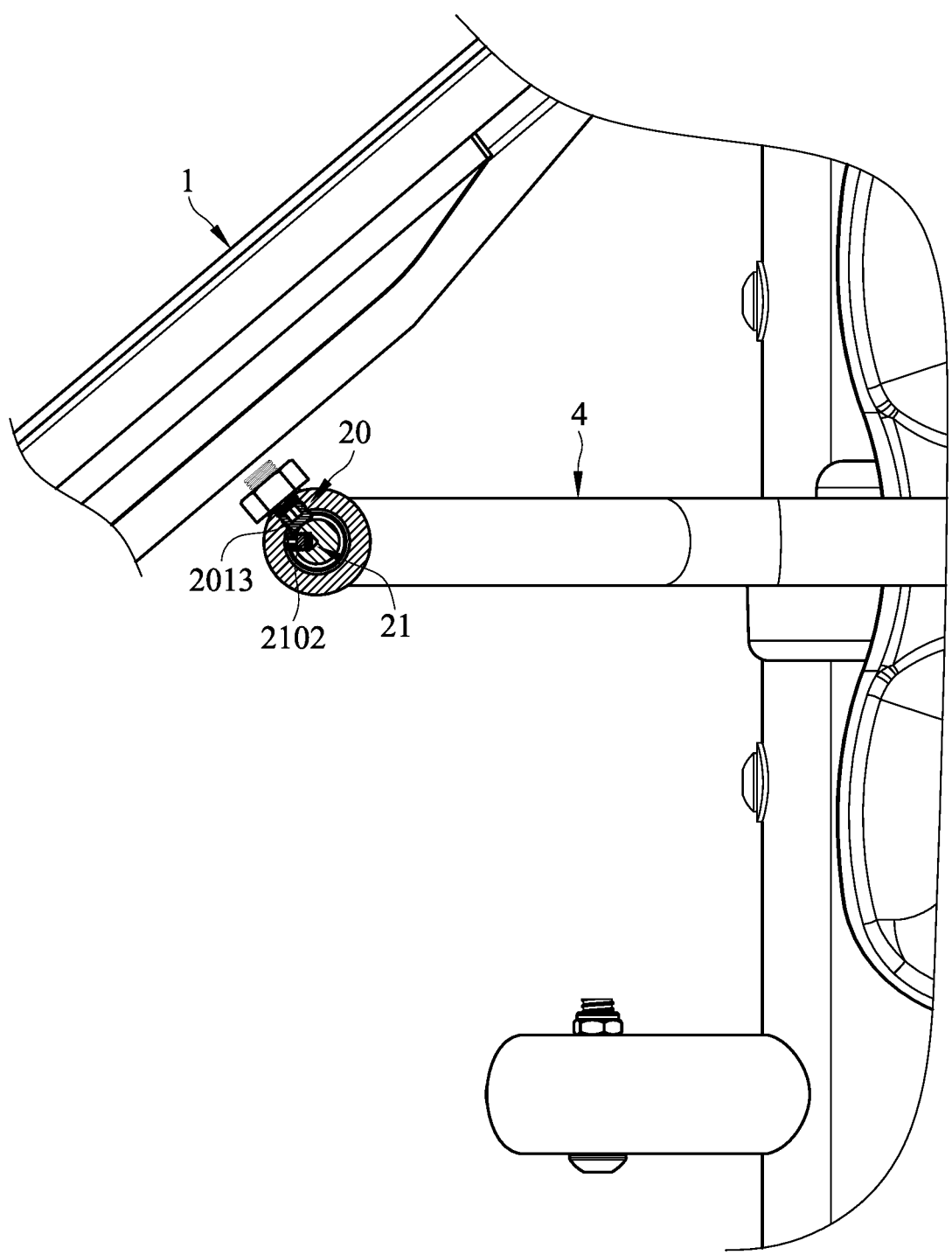
FIG. 5 is a schematic top sectional view illustrating the operation of the rotating mechanism of FIG. 2.

Referring to FIG. 2 and FIG. 4, after the ball 2017 has been inserted into the second positioning hole 212, the user can continue to rotate the display 1 to make the ball 2017 leave the second positioning hole 212. The display 1 can be rotated to the right or left. When the display 1 is rotated, the first positioning post 2013 of the rotatable body 20 moves along the annular space 215 until it is blocked by the second positioning post 2102 of the stationary body 21. FIG. 5 shows that when the display 1 is rotated to the left by 130 degrees, the first positioning post 2013 is blocked by the second positioning post 2102. The same is true when the display 1 is rotated to the right.

Figure 6:
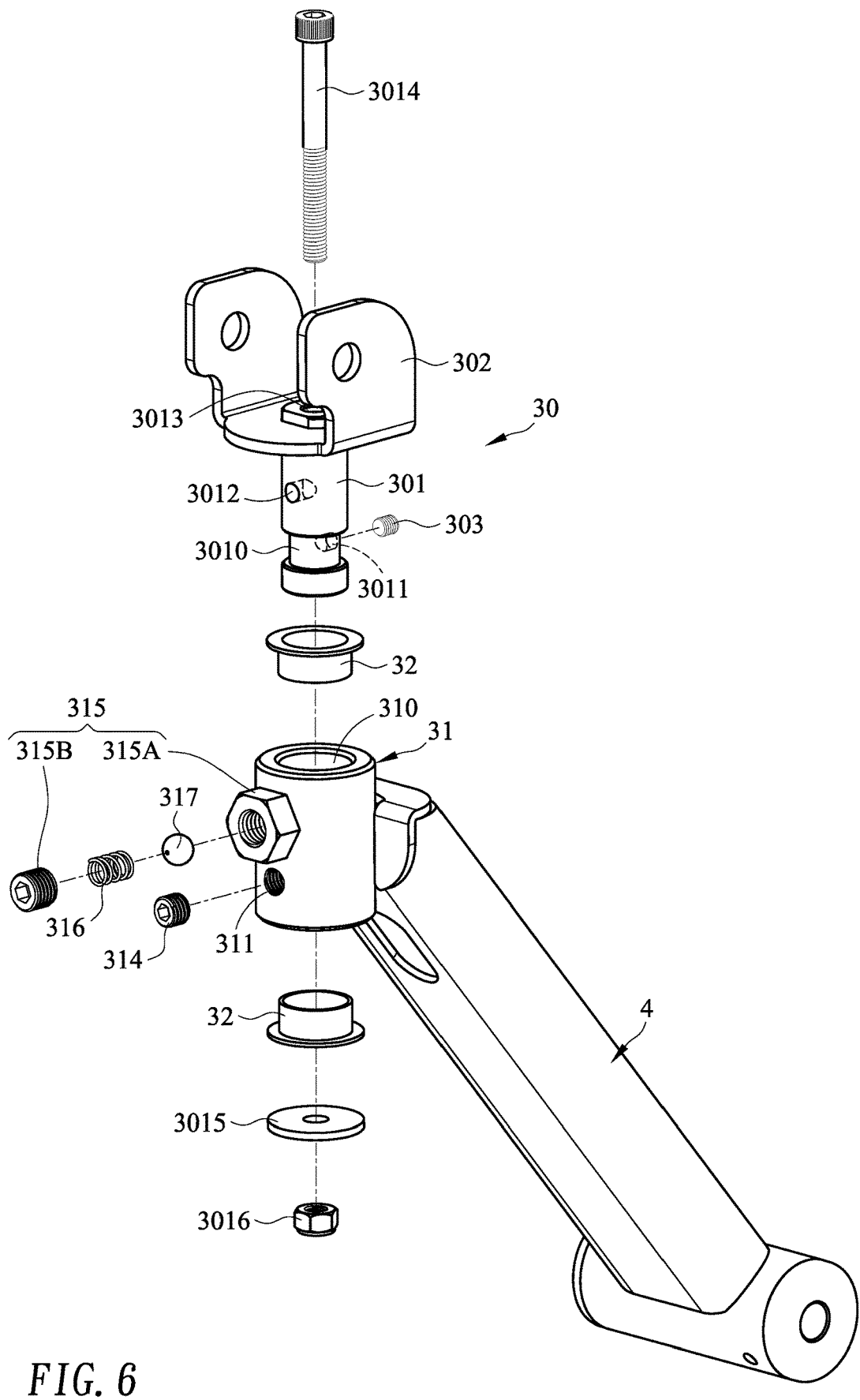
FIG. 6 is an exploded view showing a rotating mechanism in accordance with another embodiment of the present invention.
Figure 7:
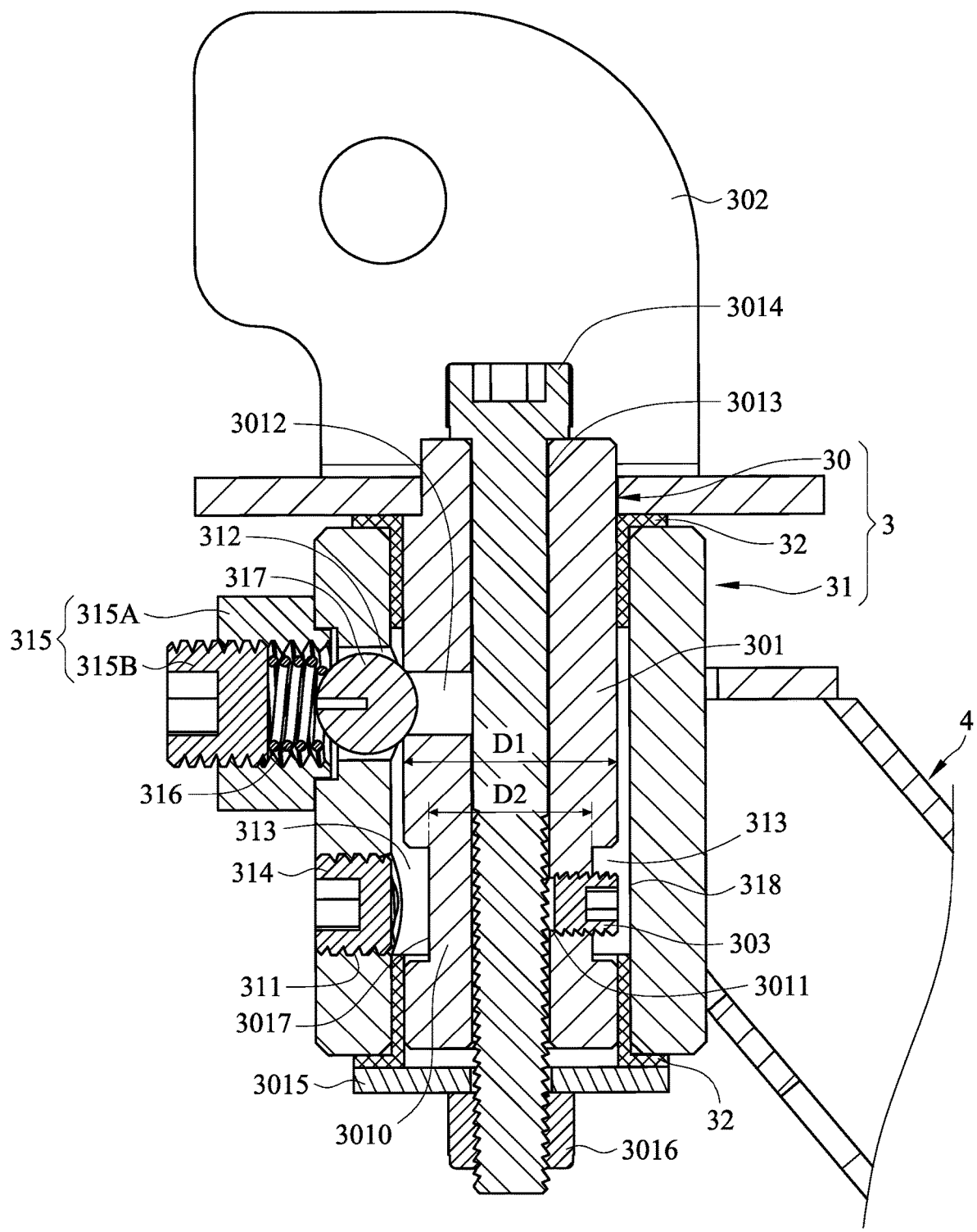
FIG. 7 is a cross-sectional view of the rotating mechanism of FIG. 6.

FIG. 6 and FIG. 7 are respectively an exploded view and a cross-sectional view of a rotating mechanism 3 in accordance with another embodiment of the present invention. Referring to FIGS. 6-7, the rotating mechanism 3 includes a rotatable body 30 and a stationary body 31. The rotatable body 30 is basically composed of a cylinder 301 and a retaining bracket 302. The cylinder 301 is fixed to the retaining bracket 302, and the display 1 is mounted on the retaining bracket 302. The center of the cylinder 301 has a longitudinal hole 3013, and a fixing part 3014, such as a bolt, passes through the longitudinal hole 3013 and is connected to a washer 3015 and a nut 3016. The stationary body 31 is substantially in the shape of a hollow cylinder and includes a channel 310 in the central area for accommodating the rotatable body 30. In addition, a wall of the stationary body 31 includes a first through hole 311 and a second through hole 312 (FIG. 7). The stationary body 31 is fixed to the mechanism 4 of the exercise equipment. The cylinder 301 of the rotatable body 30 further includes a cylindrical recessed area 3010 whose diameter D2 is smaller than the diameter D1 of the cylinder 301, so that an annular space 313 is formed between the rotatable body 30 and the inner side of the stationary body 31. The cylinder 301 of the rotatable body 30 further includes a first positioning hole 3011 and a second positioning hole 3012. The first positioning hole 3011 is formed in the recessed area 3010. The elevation of the first positioning hole 3011 is the same as the elevation of the first through hole 311, and the elevation of the second positioning hole 3012 is the same as the elevation of the second through hole 312.

Referring to FIG. 6 and FIG. 7, the stationary body 31 further includes a first positioning post 314 disposed in the first through hole 311 and extended to the annular space 313 (not contact the outer surface 3017 of the recessed area 3010). The first positioning post 314 may be a set screw, but it is not limited thereto. Other components having the similar shape or capable of performing the same function can also be used.

Referring to FIG. 6 and FIG. 7, the rotatable body 30 further includes a second positioning post 303, which is disposed in the first positioning hole 3011 and extends to the annular space 313 (not contact the interior surface 318 of the stationary body 31). The second positioning post 303 may be a set screw, but it is not limited thereto. Other components having the similar shape or capable of performing the same function can also be used.

Referring to FIG. 6 and FIG. 7, the stationary body 31 may further have a holding member 315, a spring 316 and a ball 317. The holding member 315 is arranged on the outer surface of the stationary body 31, the ball 317 is arranged in the second through hole 312, and the spring 316 is arranged between the holding member 315 and the ball 317. In the exemplary embodiment, the holding member 315 may include a nut 315A and a set screw 315B, and other components having the similar shape or capable of performing the same function can also be used. The nut 315A may be mounted to the stationary body 31, for example, by welding.

Referring to FIG. 6 and FIG. 7, there may be two bushings 32 between the rotatable body 30 and the stationary body 31 to reduce the sound generated by the rotation of the rotatable body 30.

Referring to FIG. 6 and FIG. 7, through the above design, the rotatable body 30 can rotate relative to the stationary body 31. In addition, the display 1 is fixed with the rotatable body 30, and the stationary body 31 is fixed with the mechanism 4 of the exercise equipment. Therefore, the display 1 can be rotated with the rotatable body 30. As shown in FIG. 1A and FIG. 7, when the display 1 is rotated so that the second through hole 312 corresponds to the second positioning hole 3012, the ball 317 (e.g., steel ball) is inserted into the second positioning hole 3012 by a force provided by the spring 316, thereby producing a sound to notify the user that the display 1 has been rotated to, e.g., 90 degrees so as to face a side the exercise equipment.

Referring to FIG. 6 and FIG. 7, after the ball 317 has been inserted into the second positioning hole 3012, the user can continue to rotate the display 1 to make the ball 317 leave the second positioning hole 3012. The display 1 can be rotated to the right or left. When the display 1 is rotated, the second positioning post 303 of the rotatable body 30 moves along the annular space 313 until it is blocked by the first positioning post 314 of the stationary body 31. The principle of this embodiment is similar to that of the embodiment of FIGS. 2-3.

By the rotation mechanism 2 or the rotation mechanism 3 of the exemplary embodiments, the angle of rotation of the display 1 has an upper limit to avoid the wires being damaged. In addition, a sound be generated to notify the user that the display 1 has been rotated to a certain angle, e.g., 90 degrees.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

Although specific embodiments have been illustrated and described, it will be appreciated by those skilled in the art that various modifications may be made without departing from the scope of the present invention, which is intended to be limited solely by the appended claims.

What is claimed is:

1. An exercise equipment, comprising:
   a display; and
   a rotating mechanism connected to the display to rotate the display to an angle by turning right or left;
   wherein the rotating mechanism comprises:
   a rotatable body being fixed to the display and comprising a hollow cylinder, the hollow cylinder comprising a channel and comprising a first through hole at its wall;
   a stationary body being arranged in the channel and comprising a lower end fixed with a mechanism of the exercise equipment, the stationary body further comprising a recessed area configured to form an annular space between the rotatable body and the recessed area, the stationary body further comprising a first positioning hole located in the recessed area;
   a first positioning post disposed in the first through hole and extending to the annular space without contacting an outer surface of the recessed area; and
   a second positioning post disposed in the first positioning hole and extending to the annular space without contacting an inner surface of the hollow cylinder;
   whereby the rotation of the rotatable body causes the first positioning post to move along the annular space until it is blocked by the second positioning post.

2. The exercise equipment according to claim 1, wherein the rotatable body further comprises a retaining bracket, the hollow cylinder is fixed with the retaining bracket, and the display is mounted on the retaining bracket.

3. The exercise equipment according to claim 1, wherein:
   the wall of the hollow cylinder further comprises a second through hole;
   the stationary body further comprises a second positioning hole, and the elevation of the second positioning hole is the same as the elevation of the second through hole; and
   the rotating mechanism further comprises:
   a holding member arranged outside the hollow cylinder;
   a ball disposed in the second through hole; and
   a spring arranged between the holding member and the ball.

4. The exercise equipment according to claim 3, wherein the holding member comprises a nut and a set screw.

5. The exercise equipment according to claim 3, wherein when the display is rotated to 90 degrees, the second through hole corresponds to the second positioning hole.

6. An exercise equipment, comprising:
a display; and
a rotating mechanism connected to the display to rotate the display to an angle by turning right or left;
wherein the rotating mechanism comprises:
a stationary body comprising a channel and comprising a first through hole at its wall, the stationary body being fixed with a mechanism of the exercise equipment;
a rotatable body being fixed with the display and being disposed in the channel, the rotatable body comprising a cylinder, the cylinder comprising a recessed area configured to form an annular space between the stationary body and the recessed area, the rotatable body further comprising a first positioning hole located in the recessed area;
a first positioning post disposed in the first through hole and extending to the annular space without contacting an outer surface of the recessed area; and
a second positioning post disposed in the first positioning hole and extending to the annular space without contacting an inner surface of the stationary body;
whereby the rotation of the rotatable body causes the second positioning post to move along the annular space until it is blocked by the first positioning post.

7. The exercise equipment according to claim 6, wherein the rotatable body further comprises a retaining bracket, the cylinder is fixed with the retaining bracket, and the display is mounted on the retaining bracket.

8. The exercise equipment according to claim 6, wherein:
the wall of the stationary body further comprises a second through hole;
the rotatable body further comprises a second positioning hole, and the elevation of the second positioning hole is the same as the elevation of the second through hole;
the rotating mechanism further comprises:
a holding member arranged outside the stationary body;
a ball disposed in the second through hole; and
a spring arranged between the holding member and the ball.

9. The exercise equipment according to claim 8, wherein the holding member comprises a nut and a set screw.

10. The exercise equipment according to claim 8, wherein when the display is rotated to 90 degrees, the second through hole corresponds to the second positioning hole.

\* \* \* \* \*